(12) United States Patent
Nihei et al.

(10) Patent No.: US 10,705,215 B2
(45) Date of Patent: Jul. 7, 2020

(54) DISTANCE MEASUREMENT APPARATUS, AND METHOD OF MEASURING DISTANCE

(71) Applicant: Ricoh Company, Ltd., Tokyo (JP)

(72) Inventors: Yasuhiro Nihei, Kanagawa (JP); Toshishige Fujii, Kanagawa (JP); Takeshi Ogawa, Kanagawa (JP); Hiroaki Tanaka, Tokyo (JP); Shu Takahashi, Kanagawa (JP); Yoichi Ichikawa, Kanagawa (JP); Masahiro Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 335 days.

(21) Appl. No.: 15/808,968

(22) Filed: Nov. 10, 2017

(65) Prior Publication Data

US 2018/0136330 A1    May 17, 2018

(30) Foreign Application Priority Data

Nov. 16, 2016 (JP) .................. 2016-223175

(51) Int. Cl.
| | | |
|---|---|---|
| *G01C 3/08* | (2006.01) | |
| *G01S 17/10* | (2020.01) | |
| *G01S 7/48* | (2006.01) | |
| *G01S 7/484* | (2006.01) | |
| *G01S 7/4865* | (2020.01) | |
| *H05B 47/105* | (2020.01) | |
| *G01S 17/931* | (2020.01) | |

(52) U.S. Cl.
CPC .............. *G01S 17/10* (2013.01); *G01S 7/484* (2013.01); *G01S 7/4808* (2013.01); *G01S 7/4865* (2013.01); *H05B 47/105* (2020.01); *G01S 17/931* (2020.01)

(58) Field of Classification Search
CPC ...... G01S 17/10; G01S 17/936; G01S 7/4808; G01S 7/4865; G01S 7/484; H05B 37/0227
USPC ........................................ 356/4.07
See application file for complete search history.

(56) References Cited

U.S. PATENT DOCUMENTS

| | | | |
|---|---|---|---|
| 2003/0218919 A1* | 11/2003 | Arita ...................... | G01S 17/42 365/200 |
| 2005/0271102 A1* | 12/2005 | Asuri .................. | H01S 5/06832 372/38.07 |
| 2016/0370460 A1 | 12/2016 | Takahashi et al. | |
| 2017/0199271 A1 | 7/2017 | Nihei et al. | |

(Continued)

FOREIGN PATENT DOCUMENTS

| | | |
|---|---|---|
| JP | 2005-235893 | 9/2005 |
| JP | 2010-025906 | 2/2010 |

(Continued)

*Primary Examiner* — Mark Hellner
(74) *Attorney, Agent, or Firm* — Xsensus LLP

(57) ABSTRACT

An distance measurement apparatus includes a light source to emit irradiation light, circuitry to output, to the light source, a first current that changes in accordance of light-emission timing information defining at least turn-on timing of the light source, and a second current that does not change in accordance of the light-emission timing information, a sensor to detect reflection light reflected from an object irradiated with the irradiation light emitted from the light source. The circuitry calculates a distance to the object based on a detection amount of the reflection light detected by the sensor.

10 Claims, 14 Drawing Sheets

COMPARISON EXAMPLE

(56) References Cited

U.S. PATENT DOCUMENTS

2017/0212224 A1 7/2017 Itoh et al.
2017/0261611 A1 9/2017 Takahashi et al.

FOREIGN PATENT DOCUMENTS

| JP | 2015-068748 | 4/2015 |
| JP | 2016-008875 | 1/2016 |
| JP | 2017-009339 | 1/2017 |
| JP | 2017-015611 | 1/2017 |
| JP | 2017-116314 | 6/2017 |
| JP | 2017-125829 | 7/2017 |
| JP | 2017-133853 | 8/2017 |
| JP | 2017-156306 | 9/2017 |
| JP | 2017-167120 | 9/2017 |

* cited by examiner

COMPARISON EXAMPLE

DISTANCE MEASUREMENT APPARATUS, AND METHOD OF MEASURING DISTANCE

This application claims priority pursuant to 35 U.S.C. § 119(a) to Japanese Patent Application No. 2016-223175 filed on Nov. 16, 2016 in the Japan Patent Office, the disclosure of which is incorporated by reference herein in its entirety.

BACKGROUND

Technical Field

This disclosure relates to a distance measurement apparatus, and a method of measuring distance.

Background Art

Lately, distance measurement apparatuses that measure distance to objects have been developed. For example, a technique irradiating modulated light from a light source to a target space, and determining a distance to an object existing in the target space based on a phase difference of the irradiated light and the light reflected from the object is known. Although conventional technologies can measure distance to objects, a further improvement of the measurement technique is in pursuit to improve accuracy of distance measurement.

SUMMARY

As one aspect of the present invention, a distance measurement apparatus is devised. The distance measurement apparatus includes a light source to emit irradiation light, circuitry to output, to the light source, a first current that changes in accordance of light-emission timing information defining at least turn-on timing of the light source, and a second current that does not change in accordance of the light-emission timing information, a sensor to detect reflection light reflected from an object irradiated with the irradiation light emitted from the light source. The circuitry calculates a distance to the object based on a detection amount of the reflection light detected by the sensor.

As another aspect of the present invention, a method of measuring distance to an object is devised. The method includes outputting, to a light source, a first current that changes in accordance of light-emission timing information defining at least turn-on timing of the light source, and a second current that does not change in accordance of the light-emission timing information, detecting reflection light reflected from an object irradiated with irradiation light emitted from the light source, and calculating a distance to the object based on a detection amount of the reflection light detected by the sensor.

BRIEF DESCRIPTION OF THE DRAWINGS

A more complete appreciation of the description and many of the attendant advantages and features thereof can be readily obtained and understood from the following detailed description with reference to the accompanying drawings, wherein.

Figure 1:
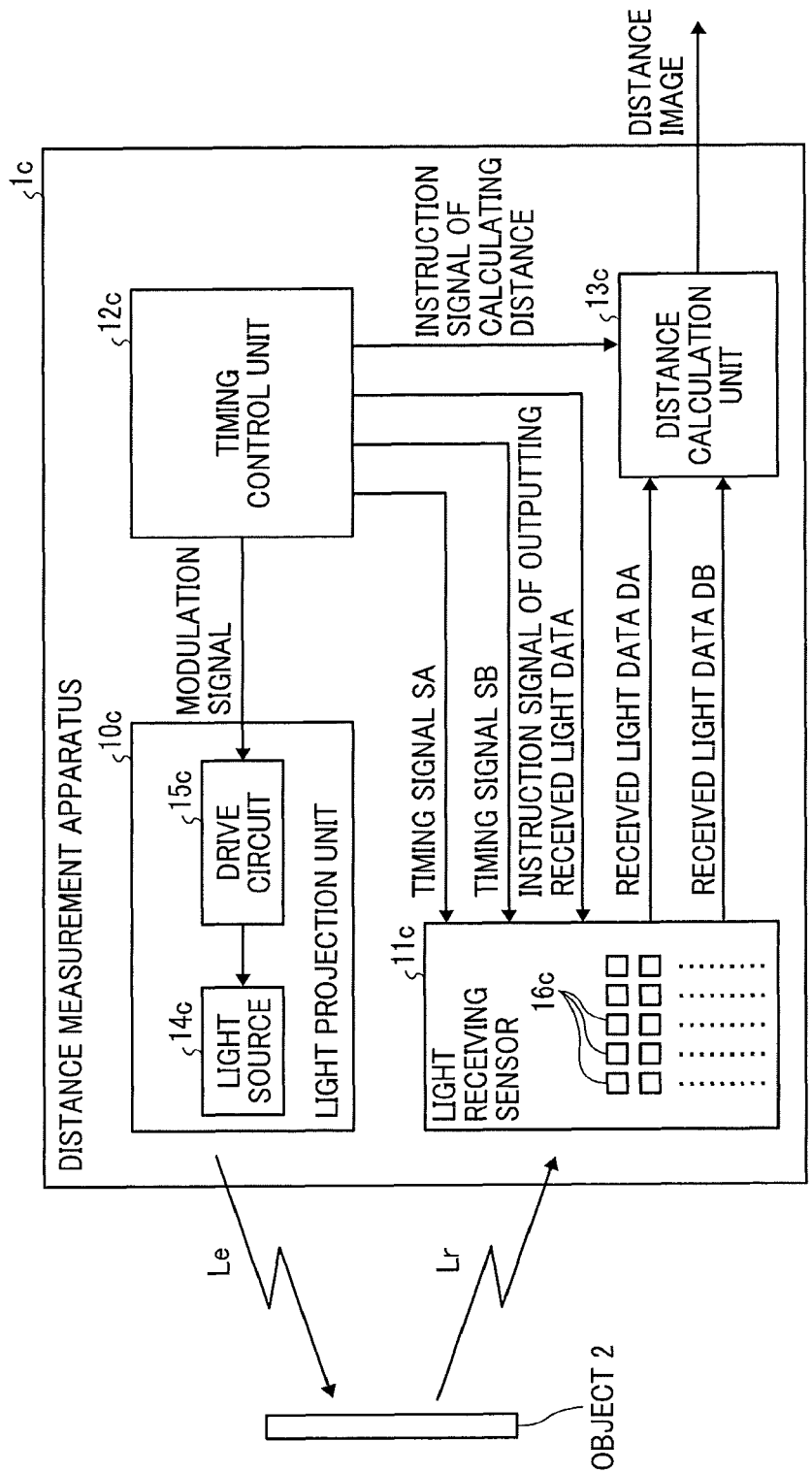
FIG. 1 illustrates an example of a schematic configuration of a distance measurement apparatus of a comparison example.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Prior to a description of a distance measurement apparatus according to a first embodiment of the present invention, a distance measurement apparatus of a comparison example is described. The distance measurement apparatus can be also referred to as a range finding apparatus or a range finder.

Comparison Example

FIG. 1 illustrates an example of a schematic configuration of a distance measurement apparatus 1c of a comparison example. The distance measurement apparatus 1c includes, for example, a light projection unit 10c, a light-receiving sensor 11c, a timing control unit 12c, and a distance calculation unit 13c.

The light projection unit 10c includes, for example, a light source 14c, and a drive circuit 15c that outputs a drive current to the light source 14c.

The light source 14c, employs, for example, a semiconductor laser.

When the drive circuit 15c receives a modulation signal from the timing control unit 12c, the drive circuit 15c outputs a modulation current in response to the modulation signal to the light source 14c. As a result, a modulated light corresponding to the modulation current is emitted from the light source 14c, and the light is projected to a target space as irradiation light Le or emitted light Le. When an object 2, which is a to-be-measured target object, exists within a light projection range of the light projection unit 10c, the projected light (i.e., irradiation light Le) is irradiated to the object 2.

The light-receiving sensor 11c includes a plurality of light-receiving elements 16c arranged in a two dimensional array, and each of the light-receiving elements 16c is, for example, a photodiode, a phototransistor or the like.

Figure 2:
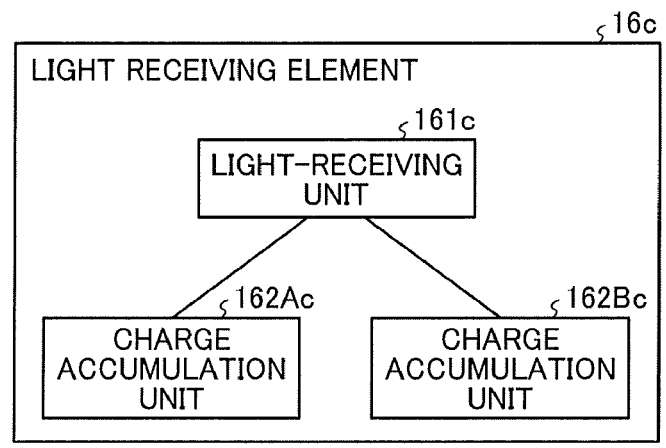
FIG. 2 illustrates a schematic configuration of a light-receiving element of the comparison example.

FIG. 2 illustrates a schematic configuration of each one of the light-receiving elements 16c of the comparison example. The light-receiving element 16c includes, for example, one light-receiving unit 161c, and two charge accumulation units 162Ac and 162Bc. Each of the light-receiving elements 16c receives the light irradiated to the object 2 and then reflected from the irradiated object 2 as reflection light Lr. In each of the light-receiving units 161c, electric charge corresponding to the received light quantity is generated. Each of the light-receiving elements 16c accumulates electric charges generated by the light-receiving unit 161c in accordance of a timing signal SA and a timing signal SB transmitted from the timing control unit 12c.

Specifically, when the timing signal SA is at the "H" level, each of the light-receiving elements 16c accumulates the electric charge in the charge accumulation unit 162Ac, and when the timing signal SB is at the "H" level, each of the light-receiving elements 16c accumulates the electric charge in the charge accumulation unit 162Bc.

The timing control unit 12c repeatedly outputs the modulation signal, the timing signal SA, and the timing signal SB, with which the electric charge is gradually accumulated. Then, after the accumulation of electric charge is repeated for a given number of times, the timing control unit 12 stops to output the modulation signal, the timing signal SA, and the timing signal SB, and then outputs a signal instructing an output of received light data (i.e., instruction signal of outputting received light data) to the light-receiving sensor 11c.

In the light-receiving sensor 11c, each of the light-receiving elements 16c sequentially outputs the electric charge accumulated in the charge accumulation unit 162Ac as received light data DA, and the electric charge accumulated in the charge accumulation unit 162Bc as received light data DB.

When the distance calculation unit 13c receives a signal instructing a calculation of distance (i.e., instruction signal of calculating distance) from the timing control unit 12c, the distance calculation unit 13c calculates distance data for each of the light-receiving elements 16c based on the received light data DA and the received light data DB transmitted from the light-receiving sensors 11c, and generates a distance image composed of pixels corresponding to the distance data received from each of the light-receiving device 16c.

The timing control unit 12c repeatedly generates the modulation signal, the timing signal SA and the timing signal SB for a given number of times, then outputs the modulation signal to the drive circuit 15c, and the timing signal SA and the timing signal SB to the light-receiving sensor 11c, and then outputs the signal instructing an output of the received light data to the light-receiving sensor 11c, and the signal instructing a calculation of distance to the distance calculation unit 13c.

Figure 3:
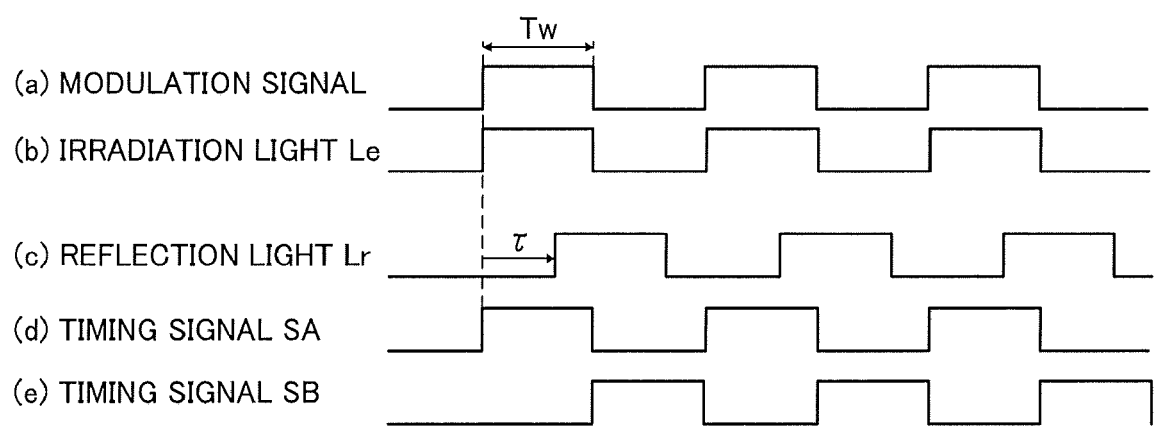
FIG. 3 illustrates an example of a time chart of signals used for an operation of the distance measurement apparatus of the comparison example.

FIG. 3 illustrates an example of a time chart of signals used for an operation of the distance measurement apparatus 1c of the comparison example, in which the timing of the modulation signal, the timing signal SA, the timing signal SB, the irradiation light Le, and the reflection light Lr are illustrated.

The modulation signal illustrated in FIG. 3(a) is a pulse signal having a pulse width Tw as a pulse time width.

The irradiation light Le illustrated in FIG. 3(b) is the light projected from the light projection unit 10c.

The reflection light Lr illustrated in FIG. 3(c) is the light reflected from the object 2 when the object 2 is irradiated by the irradiation light Le, and the reflection light Lr is received by the light-receiving sensor 11c. A waveform of the reflection light Lr is substantially the same as the waveform of the irradiation light Le.

The time "τ" illustrated in FIG. 3(c) corresponds to a time period from a time point when the irradiation light Le is projected from the light projection unit 10c until a time point when the light reflected from the object 2 enters the light-receiving sensor 11c, and the time τ varies depending on the distance to the object 2. When the time τ is known, the distance to the object 2 can be calculated by using the following formula (1) based on the speed Vc of the light, which is the constant.

$$\text{Distance} = \tau \lambda Vc/2 \qquad (1)$$

FIG. 3(d) illustrates the timing signal SA indicating a charge accumulation timing signal output from the timing control unit 12c to the light-receiving sensor 11c. FIG. 3(e) illustrates the timing signal SB indicating a charge accumulation timing signal output from the timing control unit 12c to the light-receiving sensor 11c.

The timing signal SA transits to the "H" level at the same timing of the irradiation light Le, and then transits to the "L" level after the pulse width Tw. The timing signal SB transits to the "H" level simultaneously when the timing signal SA transits to the "L" level, and then transits to the "L" level after the pulse width Tw.

Charges are accumulated in the charge accumulation unit 162Ac during a period when the timing signal SA is being at the "H" level. Charges are accumulated into the charge accumulation unit 162Bc during a period when the timing signal SB is being at the "H" level.

Figure 4:
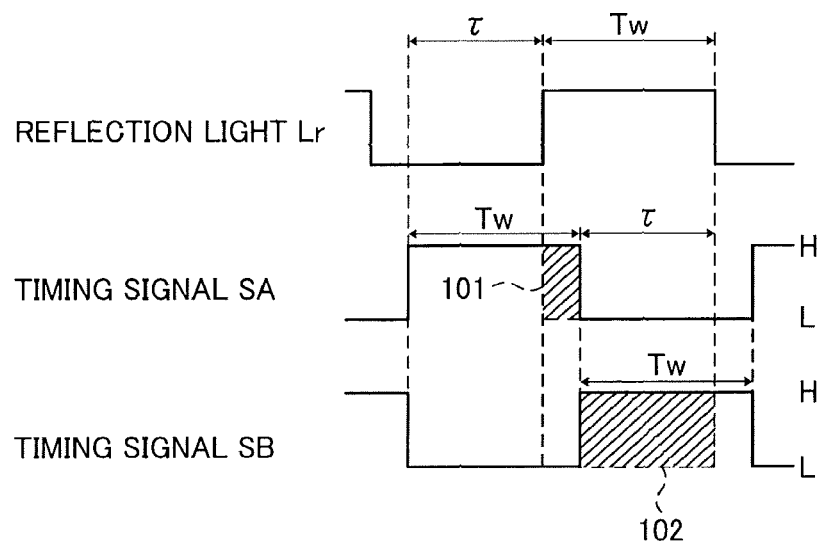
FIG. 4 illustrates a schematic diagram of amount of charges accumulated in each of charge accumulation units when a light source has an ideal characteristics in the comparison example.

In this configuration, when the light source 14c has an ideal characteristic, the light source 14c emits the light without delaying the rising of modulation current that is a pulse current supplied to the light source 14c, in which a relationship between the reflection light Lr and the amount of charges accumulated in the charge accumulation units 162Ac and 162Bc becomes as follows as indicated in FIG. 4.

FIG. 4 illustrates a schematic diagram of amount of charges accumulated in each of the charge accumulation units 162Ac and 162Bc when the light source 14c has an ideal characteristics in the comparison example.

When the light source 14c has the ideal characteristics as described above, the pulse width of the irradiation light Le matches the pulse width Tw of an input signal (i.e., modulation current and modulation signal), and as a result, as illustrated in FIG. 4, the pulse width of the reflection light Lr, the pulse width of timing signal SA, and the pulse width of timing signal SB becomes the same.

In this configuration, an electric charge amount corresponding to an area 101 is accumulated in the charge accumulation unit 162Ac, and an electric charge amount corresponding to an area 102 is accumulated in the charge accumulation unit 162Bc for one pulse.

Since the ratio of the area 101 and the area 102 is defined by (Tw−τ):τ, the ratio DA:DB of the received light data DA and the received light data DB is defined by (Tw−τ):τ.

Based on this relationship, the charge amount corresponding to a phase difference between the irradiation light Le and the reflection light Lr (τ/Tw) is expressed by the following formula (2), in which the time "τ" is assumed to satisfy "0≤τ≤Tw."

$$\tau/Tw = DB/(DA+DB) \qquad (2)$$

Then, the formula (3) for calculating the distance can be derived from the formulas (1) and (2).

$$\text{Distance} = DB/(DA+DB) \times Tw \times Vc/2 \qquad (3)$$

The distance calculation unit 13c calculates distance data by substituting the received light data DA and the received light data DB in the formula (3).

Figure 5:
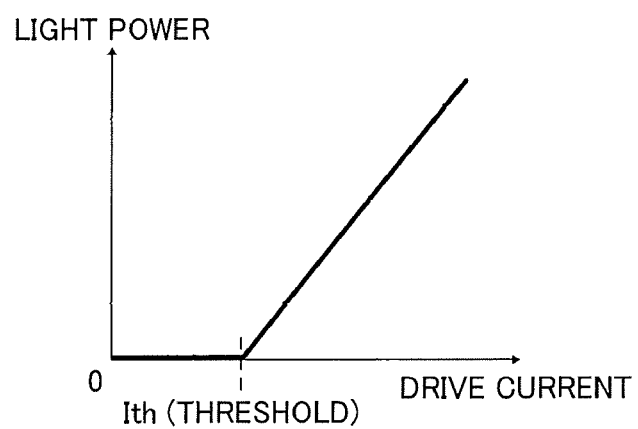
FIG. 5 illustrates an emission characteristics of a semiconductor laser.

Typically, as illustrated in FIG. 5, a semiconductor laser has the characteristics that the increase of the light power with respect to the increase of the drive current is very small until the drive current becomes a threshold value Ith, and then the increase of the light power with respect to the increase of the drive current becomes greater when the drive current exceeds the threshold value Ith.

Therefore, when the semiconductor laser is employed as the light source 14c, a delay occurs in the light emission from the light source 14c with respect to the rising of modulation current supplied to the light source 14c because the semiconductor laser has the above described characteristics (FIG. 5). As a result, the pulse width of the irradiation light Le that is actually projected becomes shorter than the pulse width Tw of the modulation signal supplied from the timing control unit 12c.

Figure 6:
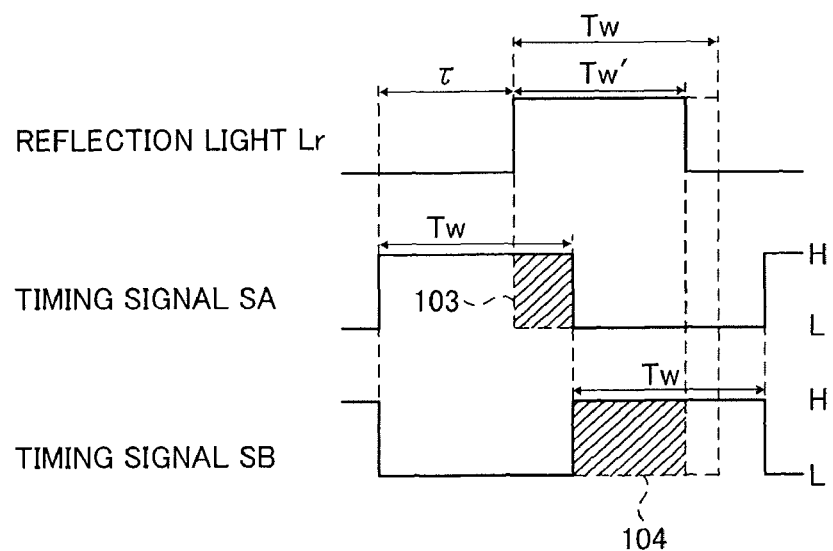
FIG. 6 illustrates a schematic diagram of amount of charges accumulated in each of charge accumulation units when a light source employs a semiconductor laser in the comparison example.

FIG. 6 illustrates a schematic diagram of amount of charges accumulated in each of the charge accumulation units 162Ac and 162Bc when the light source 14c employs the semiconductor laser having the above described characteristics (FIG. 5) in the comparison example.

If the semiconductor laser is employed as the light source 14c, an electric charge amount corresponding to an area 103 is accumulated in the charge accumulation unit 162Ac, and an electric charge amount corresponding to an area 104 is accumulated in the charge accumulation unit 162Bc for one pulse.

In an example case of FIG. 6, the pulse width Tw' of the reflection light Lr becomes smaller than the pulse width Tw, in which a size of the area 103 is equal to a size of the area 101, but a size of the area 104 is smaller than a size of the area 102 for an amount corresponding to the decrease of the pulse width defied as (Tw−Tw').

As a result, the ratio DA:DB indicating the ratio of the received light data DA and the received light data DB deviates from the above described relationship of "(Tw−τ): τ" and a measurement error occurs when the distance is calculated by using the formula (3).

Therefore, the inventors has developed a distance measurement apparatus according to embodiments of the present invention to reduce the above described distance measurement error.

First Embodiment

Figure 7:
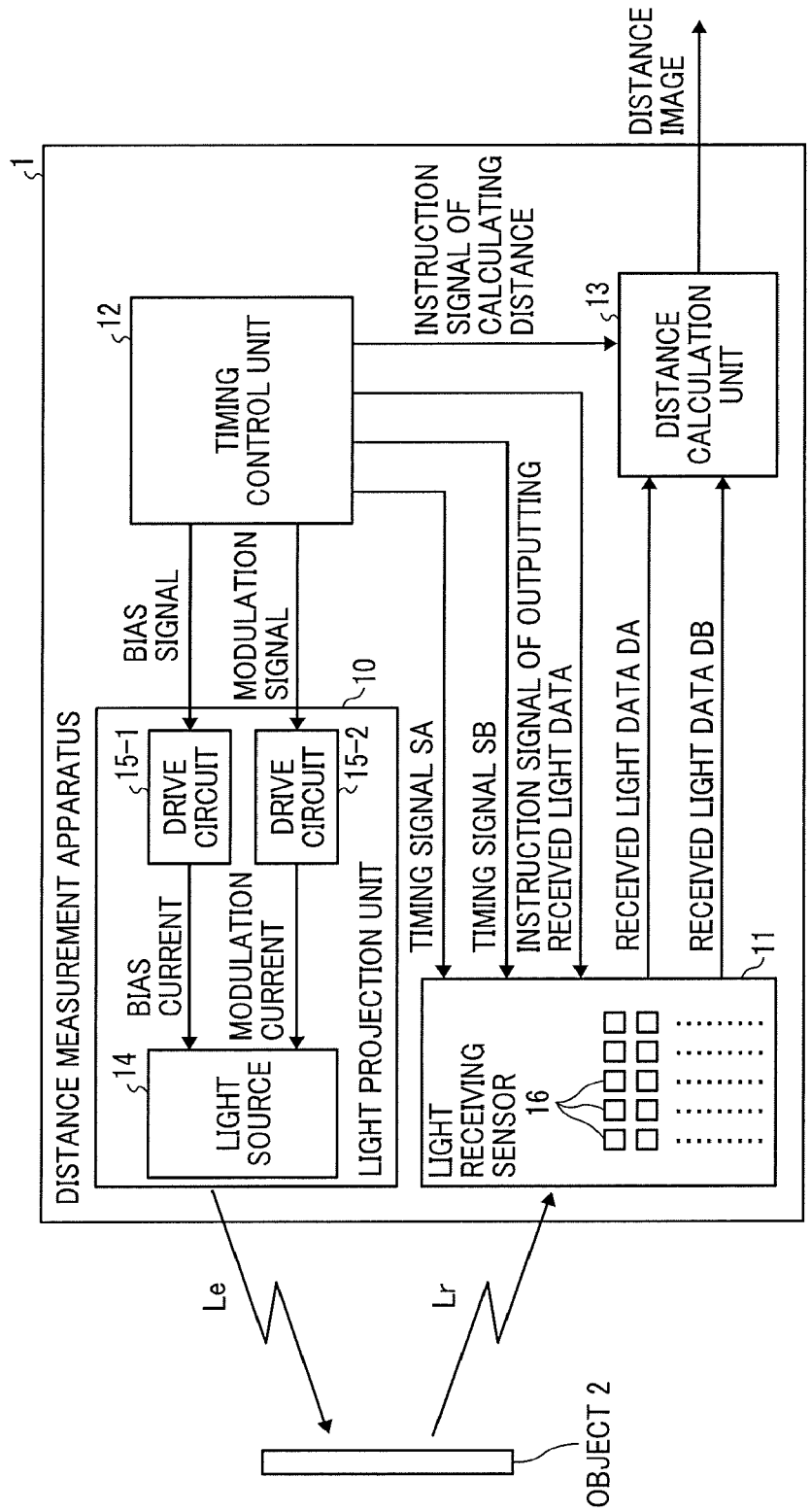
FIG. 7 illustrates an example of a schematic configuration of a distance measurement apparatus of a first embodiment.

Hereinafter, a description is given of a distance measurement apparatus 1 according to a first embodiment. FIG. 7 illustrates an example of a schematic configuration of the distance measurement apparatus 1 of the first embodiment.

The distance measurement apparatus 1 is attached to, for example, near a number plate disposed at the front end portion of a vehicle used as movable unit or a travel unit. Further, the distance measurement apparatus 1 can be mounted to other movable unit such as an aircraft, a ship, a robot or the like in addition to the vehicle such as an automobile.

As illustrated in FIG. 7, the distance measurement apparatus 1 includes, for example, a light projection unit 10, a light-receiving sensor 11, a timing control unit 12, and a distance calculation unit 13.

The light projection unit 10 includes, for example, a light source 14, two drive circuits 15-1 and 15-2, in which the drive circuits 15-1 and 15-2 drive the light source 14.

The drive circuit 15-1 outputs a bias current to the light source 14 in accordance of a bias signal transmitted from the timing control unit 12. The drive circuit 15-1 is configured such that the magnitude of the bias current is equal to the threshold value Ith of the light source 14.

Further, in a case that the output current of the drive circuit 15-1 changes depending on the magnitude of the bias signal input to the drive circuit 15-1, the magnitude of the bias signal is controlled so that the drive circuit 15-1 outputs the bias current having the same magnitude of the threshold value Ith to the light source 14, The drive circuit 15-2 outputs a modulation current to the light source 14 in accordance of a modulation signal received from the timing control unit 12.

The modulation signal is used for defining at least turn-on timing of the light source 14 (i.e., light-emission timing), and the modulation signal is, for example, a signal having a pulse waveform. The modulation signal having the "H" level indicates that the light source 14 is turned on, and the modulation signal having the "L" level indicates that the light source 14 is turned off. Therefore, the transition from the "L" level to the "H" level of the modulation signal indicates the turn-on timing of the light source 14 (i.e., light-emission timing).

Further, the transition from the "H" level to the "L" level of the modulation signal indicates the turn-off timing of the light source 14. As above described, the modulation signal having the pulse waveform is used as information for defining the timing of turning on and the timing of turning off the light source 14.

The light source 14 has the characteristics that the increase of the light power with respect to the increase of the drive current is very small until the drive current becomes the threshold value Ith, and then the increase of the light power with respect to the increase of the drive current becomes greater when the drive current exceeds the threshold value Ith. The light source 14 employs, for example, a semiconductor laser such as an edge-emitting laser diode (LD) or a surface emitting laser such as vertical cavity surface emitting laser (VCSEL), or a light-emitting diode.

The current output from the drive circuit 15-1 and the current output from the drive circuit 15-2 are superimposed and then supplied as a drive current to the light source 14. As a result, the light source 14 emits the modulated light corresponding to the drive current, and the light is projected to a target space as the irradiation light Le. When the object 2, which is a to-be-measured target object, exists within a light projection range of the light projection unit 10c, the projected light (i.e., irradiation light Le) is irradiated to the object 2.

Further, the light projection unit 10 can include a projection optical system for guiding the light emitted from the light source 14 to the target space. The projection optical system can be configured by, for example, one or more lenses, one or more mirrors, one or more glass fibers, or a combination thereof.

Figure 8:
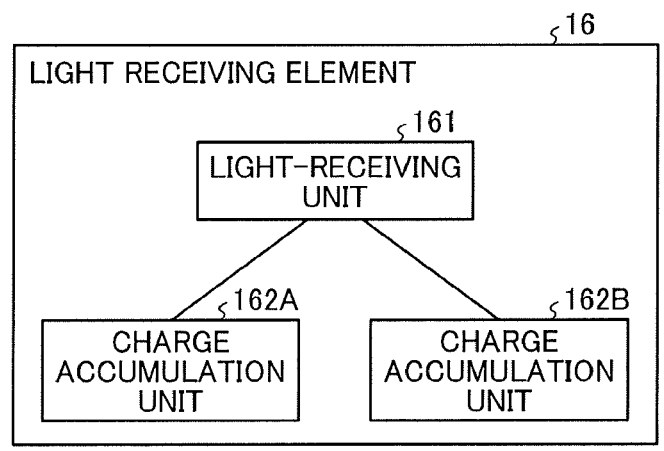
FIG. 8 illustrates a schematic configuration of a light-receiving element of the first embodiment.

The light-receiving sensor 11 employs, for example, an area sensor, and includes, for example, a plurality of light-receiving elements 16 arranged two dimensionally. The light-receiving element 16 employs, for example, a photodiode or a phototransistor FIG. 8 illustrates a schematic configuration of the light-receiving element 16 of the first embodiment. As illustrated in FIG. 8, the light-receiving element 16 includes, for example, a light-receiving unit 161, and two charge accumulation units 162A and 162B.

In each of the light-receiving element 16, the light-receiving unit 161 receives the modulated light (i.e., reflection light Lr) reflected from the object 2 irradiated by the irradiation light Le. Then, the light-receiving unit 161 generates electric charges having an amount corresponding to an amount of the received light. Then, each of the light-receiving elements 16 accumulates the electric charges generated by the light-receiving unit 161 in accordance of the timing signal SA and the timing signal SB transmitted from the timing control unit 12.

Specifically, each of the light-receiving element 16 accumulates the electric charges in the charge accumulation unit 162A when the timing signal SA is at the "H" level, and accumulates the electric charges in the charge accumulation unit 162B when the timing signal SB is at the "H" level.

The timing control unit 12 repeatedly outputs the modulation signal, the timing signal SA, and the timing signal SB, with which the electric charge is gradually accumulated. Then, after the accumulation of electric charge is repeated for a given number of times, the timing control unit 12 stops to output the modulation signal, the timing signal SA, and the timing signal SB, and then outputs a signal instructing the output of the received data to the light-receiving sensor 11.

When the light-receiving sensor 11 receives the signal instructing the output of the received data, each of the light-receiving elements 16 sequentially outputs the charge amount accumulated in the charge accumulation units 162A and 162B as the received light data DA and the received light data DB, respectively.

As to the light-receiving sensor 11 configured as above described, the light-receiving sensor 11 can detect the reflection light Lr received from the object 2, and can output the received light data DA and the received light data DB as a detection amount of the reflection light Lr.

Further, the distance measurement apparatus 1 can include a light receiving optical system for guiding the reflection light Lr to the light-receiving sensor 11. The light-receiving optical system can be configured by, for example, one or more lenses, one or more mirrors, one or more glass fibers, or a combination thereof.

Further, when the distance calculation unit 13 receives a signal instructing the calculation of distance from the timing control unit 12, the distance calculation unit 13 calculates distance data (distance) for each of the light-receiving elements 16 using the received light data DA and the received light data DB transmitted from the light-receiving sensor 11. The distance calculation unit 13 calculates the distance data by substituting the received light data DA and the received light data DB in the above formula (3).

The distance calculation unit 13 generates a distance image using the distance data calculated for each of the light-receiving elements 16 as pixels, and outputs the distance image. The position of each pixel in the distance image corresponds to the position of each of the light-receiving elements 16 in the array of the light-receiving elements 16. The distance image means an image configured by the distance to the object 2 indicated by data of each of the plurality of pixels.

Then, the distance image is transmitted to an electronic control unit (ECU), which performs control of a vehicle such as the braking control (e.g., automatic braking) and the steering control (e.g., automatic steering).

The timing control unit 12 generates the bias signal and the modulation signal, and outputs the bias signal and the modulation signal to the light projection unit 10. Further, the timing control unit 12 repeatedly generates the timing signal SA and the timing signal SB having the same waveform of the modulation signal for a given number of times, respectively, and outputs the generated timing signal SA and timing signal SB to the light-receiving sensor 11.

Then, after the timing control unit 12 repeatedly generates the modulation signal, the timing signal SA, and the timing signal SB for the given number of times, the timing control unit 12 outputs the signal instructing the output of the received data to the light-receiving sensor 11, and the signal instructing the calculation of distance to the distance computing unit 13.

Figure 9:
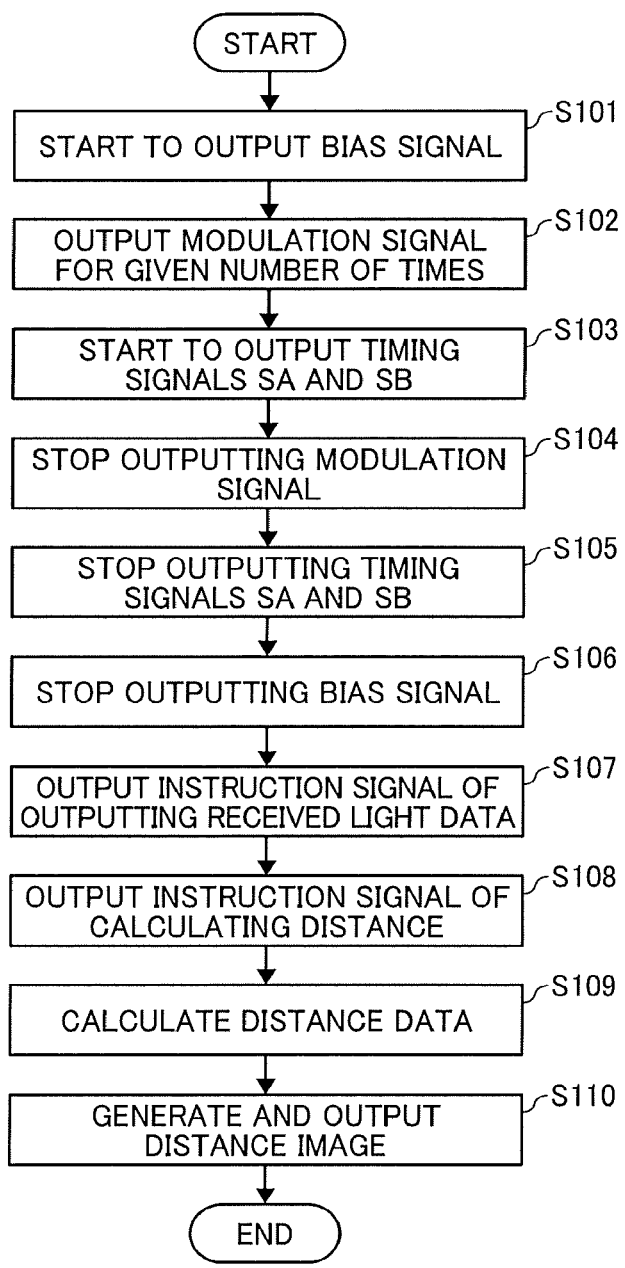
FIG. 9 is an example of a flowchart illustrating the steps of an operation of the distance measurement apparatus of the first embodiment.
Figure 10:
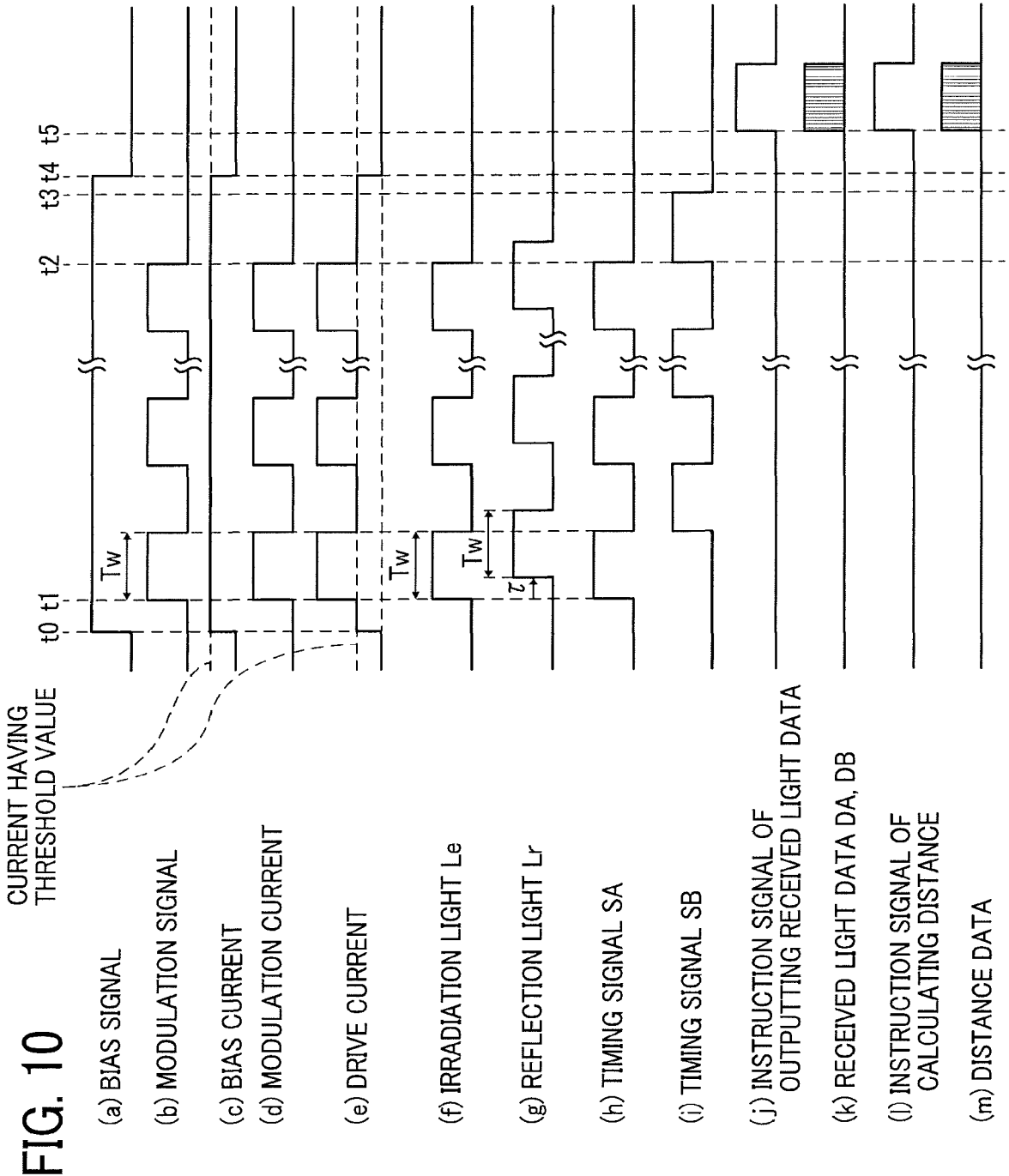
FIG. 10 is an example of a time chart of signals and data used for an operation of the distance measurement apparatus of the first embodiment.

FIG. 9 is an example of a flowchart illustrating the steps of an operation of the distance measurement apparatus 1 of the first embodiment. FIG. 10 is an example of a time chart of signals and data used for an operation of the distance measurement apparatus 1 of the first embodiment, in which the timing of the bias signal, the modulation signal, the bias current, the modulation current, the drive current, the irradiation light Le, the reflection light Lr, the timing signal SA, the timing signal SB, the signal instructing the output of the received data, the signal instructing the calculation of distance, and the calculation of distance data are illustrated.

When the distance to the object 2 is to be measured, the timing control unit 12 starts to output the bias signal (S101 in FIG. 9, FIG. 10(a), time t0 in FIG. 10(a)).

Then, the drive circuit 15-1 of the light projection unit 10 outputs a bias current having a magnitude equal to the threshold Ith (FIG. 10(c)).

Then, the timing control unit 12 starts to output the modulation signal (S102 in FIG. 9, FIG. 10(b), time t1 in FIG. 10).

In this configuration, the pulse width of the modulation signal is "Tw," and the time interval between the adjacent pulses is "2×Tw." For example, the pulse width and the time interval between the adjacent pulses can be set in advance.

Then, the drive circuit 15-2 outputs a modulation current (FIG. 10(d)) in accordance of the modulation signal (FIG. 10(b)). Specifically, the drive circuit 15-2 outputs the modulation current having a given magnitude when the modulation signal is at the "H" level, and does not output the modulation current when the modulation signal is at the "L" level.

When S101 and S102 are performed, the light sources 14 is supplied with a drive current that is generated by superimposing the modulation current having a pulse waveform to the bias current having the magnitude equal to the threshold value Ith (FIG. 10(e)).

In this configuration, while the light source 14 is being supplied with the bias current having the threshold level Ith in advance during a period from time t0 to time t4, the light source 14 is further supplied with the pulse of the modulation current from time t1 to time t2, which means the light source 14 is being simultaneously supplied with the bias current and the modulation current from time t1 to time t2, which is a part of the period from time t0 to time t4 as illustrated in FIG. 10. Therefore, a delay from the rise timing of the pulse of the modulation current to the light emission timing of the light source 14 can be suppressed. As a result, the light source 14 can emit the pulse-wave irradiation light Le (FIG. 10(f)) having a pulse waveform having the pulse width Tw same as the pulse waveform of the modulation current.

Then, the timing control unit 12 starts to output the timing signal SA and the timing signal SB (S103 in FIG. 9, FIG. 10(h), (i)).

The timing signal SA and the timing signal SB can be generated, for example, by adjusting the phase of the modulation signal. The timing signal SA is transited to the "H" level at the same timing as the rising of the irradiation light Le, and then transited to the "L" level after the pulse width Tw. The timing signal SB is transited to the "H" level simultaneously when the timing signal SA is transited to the "L" level, and then transited to the "L" level after the pulse width Tw.

The irradiation light Le is reflected by the object 2, and then enters the light-receiving sensor 11 as the reflection light Lr with a delay time "τ" corresponding to the distance to the object 2 (FIG. 10(g)). In the light-receiving sensor 11, the electric charge corresponding to the received light quantity is generated in the light-receiving unit 161, and the electric charge is selectively accumulated in any one of the charge accumulation units 162A and 162 B depending on which timing signal is at the "H" level. Specifically, the electric charge is accumulated in the charge accumulation units 162A when the timing signal SA is at the "H" level, and in the charge accumulation unit 162B when the timing signal SB is at the "H" level.

After the timing control unit 12 outputs the modulation signal for the given number of times, the timing control unit 12 stops to output the modulation signal (S104 in FIG. 9, time t2 in FIG. 10). For example, the number of outputting times of the modulation signal can be set to the timing control unit 12 in advance.

After stopping the output of the modulation signal, the timing control unit 12 stops to output the timing signal SA and the timing signal SB (S105 in FIG. 9, time t3 in FIG. 10).

Then, after stopping the output of the timing signal SA and the timing signal SB, the timing control unit 12 stops to output the bias signal (S106 in FIG. 9, time t4 in FIG. 10)

Then, the timing control unit 12 outputs the signal instructing the output of the received light data to the light-receiving sensor 11 (S107 in FIG. 9, FIG. 10(j), time t5 in FIG. 10).

In response to the signal instructing the output of the received light data, in the light-receiving sensor 11, each of the light-receiving elements 16 sequentially outputs the charge amount accumulated in the charge accumulation unit 162A as the received light data DA and the charge amount accumulated in the charge accumulation unit 162B as the received light data DB to the distance calculation unit 13, respectively (FIG. 10(k)).

When the timing control unit 12 outputs the signal instructing the output of the received light data to the light-receiving sensor 11, the timing control unit 12 outputs the signal instructing the calculation of distance to the distance calculation unit 13 (S108 in FIG. 9, FIG. 10(1), time t5 in FIG. 10).

In response to the signal instructing the calculation of distance, the distance calculation unit 13 calculates the distance data for each of the light-receiving elements 16 (S109 in FIG. 9, FIG. 10(m)). Then, the distance calculation unit 13 generates a distance image by arranging each distance data, and outputs the distance image (S110 in FIG. 9). Then, the operation of the distance measurement apparatus 1 of the first embodiment is completed.

As described above, the distance measurement apparatus 1 can be mounted on the vehicle, but the distance measurement apparatus 1 is not required to be mounted on the vehicle. For example, the distance measurement apparatus 1 can be mounted on a portable survey instrument or the like to acquire three dimensional data representing geography. Further, the distance measurement apparatus 1 can be mounted on a three dimensional (3D) printer or the like to acquire three dimensional data representing a shape of a three dimensional object. Further, the distance measurement apparatus 1 can be used alone. Further, the distance measurement apparatus 1 can be equipped with a display device to output (i.e., display) a distance image.

Further, the modulation signal, used as the light-emission timing information, is not limited to the pulse signal. For example, the modulation signal can include information defining the power of emitted light. Further, for example, the modulation signal can include information defining the over-time change of the power of the emitted light.

Further, the light-emission timing information is not limited to the signal format information. The light-emission timing information can be any data defining at least the turn-on timing, and further, the data can be set in the drive circuit 15-1 in advance.

Further, the drive circuits 15-1 and 15-2 can be integrated into one circuit, or can be configured by three or more circuits. Further, the timing control unit 12 can be configured to output a signal generated by superimposing the bias signal and the modulation signal to the driving circuit 15-1 and 15-2 configured as one circuit.

Further, the distance calculation unit 13 calculates the distance by substituting the received light data DA and received light DB in the formula (3) as above described, but a method of calculating the distance is not limited thereto.

For example, a desired correction term can be added to the formula (3) to prepare another formula, and another formula can be used to calculate the distance. Further, for example, a correction coefficient can be multiplied to the right side of the formula (3) to prepare another formula, and another formula can be used to calculate the distance.

Further, the distance calculation unit 13 can be configured to store a look-up table defining the relationship of the formula (3), and can calculate the distance by searching the look-up table using the received light data DA and the received light data DB as a search key.

Further, the light-receiving sensor 11 includes a plurality of light-receiving element 16 as above described, but the light-receiving sensor 11 can be configured to include one light-receiving element 16.

Further, a part or all of the timing control unit 12 and the distance calculation unit 13 can be implemented by software executable by a computer.

Figure 11:
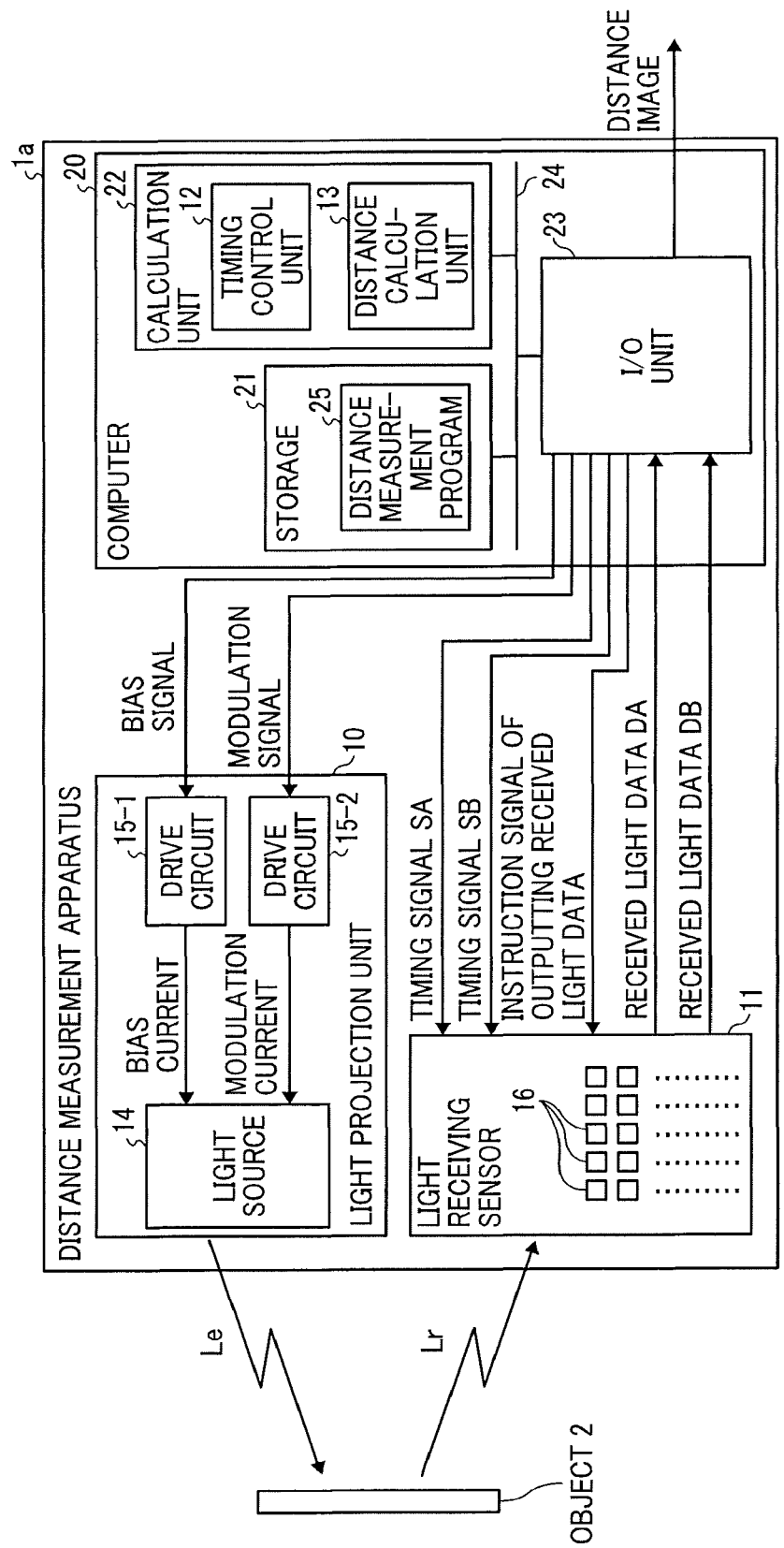
FIG. 11 illustrates another example of a schematic configuration of the distance measurement apparatus of the first embodiment, in which some components are implemented by software.

Hereinafter, a description is given of a distance measurement apparatus 1a of the first embodiment, in which the timing control unit 12 and distance calculation unit 13 are implemented by software executable by a computer. FIG. 11 illustrates an example of a schematic configuration of the distance measurement apparatus 1a of the first embodiment, in which some components are implemented by software.

As illustrated in FIG. 11, the distance measurement apparatus 1a includes, for example, a light projection unit 10, a light-receiving sensor 11, and a computer 20.

The computer 20 includes, for example, a storage 21, a calculation unit 22, and an input/output (I/O) unit 23, in which the storage 21, the calculation unit 22, and the I/O unit 23 are connected with each other via a bus 24.

The storage 21 is used to store information, and retrieve the information. The storage 21 can employ any type of memories such as a read only memory (ROM), a random access memory (RAM), a flash memory, a hard disk drive (HDD), a solid state drive (SSD), a flexible disk (FD), a compact disk read-only memory (CD-ROM), and a digital versatile disk read-only memory (DVD-ROM). Further, the storage 21 can be configured by a combination of two or more of any type of memories.

The calculation unit 22 is, for example, a central processing unit (CPU), which is a circuit or circuitry that can execute specific programs.

The I/O unit 23 is an interface device for performing the input and output of information between the computer 20 and an external devise or system.

The storage unit 21 stores distance measurement program 25 in advance. The calculation unit 22 executes the distance measurement program 25 stored in the storage 21 to implement the timing control unit 12 and the distance calculation unit 13.

The calculation unit 22 that can function as the timing control unit 12 and the distance calculation unit 13 can output the bias signal, the modulation signal, the timing signal SA, the timing signal SB, the signal instructing the output of the received light data, and the signal instructing the calculation of distance via the I/O unit 23.

Further, the calculation unit 22 that can function as the timing control unit 12 and the distance calculation unit 13 can receive the received light data DA and the received light data DB via the I/O unit 23.

The distance measurement program 25 can be recorded in a computer-readable recording medium such as a compact disk read-only memory (CD-ROM), a flexible disk (FD), a compact disk recordable (CD-R), and a digital versatile disk (DVD) as an installable format file or an executable format file.

Further, the distance measurement program 25 can be stored in an external computer connected to a network such as the Internet, and can be provided by downloading via the network. Further, the distance measurement program 25 can be provided or distributed through a network such as the Internet.

Further, the computer 20 can be shared with other computers such as an electronic control unit (ECU) or the like.

In FIG. 11, both of the timing control unit 12 and the distance calculation unit 13 are implemented by the software, but not limited thereto. For example, any one of the timing control unit 12 and the distance calculation unit 13 can be implemented by the software.

Further, a part or all of the timing control unit 12 and the distance calculation unit 13 can be implemented by one or more hardware circuits having a hardware logic.

As described above, as to the first embodiment, the distance measurement apparatuses 1 and 1a includes, for example, the light source 14, the drive circuits 15-1 and 15-2, the light-receiving sensor 11, and the distance calculation unit 13. The drive circuits 15-1 and 15-2 serving as the drive unit outputs the modulation current as a first current to the light source 14, in which the first current changes in accordance of the modulation signal used as the light-emission timing information defining at least the turn-on timing of the light source 14, and the bias current as a second current to the light source 14, in which the second current does not change in accordance of the modulation signal. The light-receiving sensor 11 serving as a sensor detects the reflection light Lr reflected from the object 2 when the irradiation light Le is emitted from the light source 14 to the object 2. The distance calculation unit 13 serving as a calculation unit calculates the distance to object 2 based on a detection amount of the reflection light Lr.

In this configuration, the light source 14 is supplied with the modulation current in a state that the bias voltage is being supplied in advance, with which the delay of light emission from the light source 14 is reduced or suppressed, and thereby the shape of the waveform of the irradiation light Le can be set closer to the shape of the desired waveform.

As a result, the distance measurement error related to the light emission characteristics of the light source 14 can be reduced or suppressed.

Further, the light source 14 has the characteristic that the change of the light power of the irradiation light Le with respect to the change of the drive current becomes greater when the drive current is greater than the threshold value Ith compared to when the drive current is smaller than the threshold value Ith, and the magnitude of the bias current is set equal to the threshold value Ith.

As a result, the light source 14 is supplied with the modulation current while the bias current having the magnitude equal to the threshold value Ith is being supplied in advance, with which the delay of light emission from the light source 14 is further reduced, and thereby the shape of the waveform of the irradiation light Le can be set further closer to the shape of the desired waveform.

Further, the magnitude of the bias current is not required to be perfectly matched to the threshold value Ith.

Further, the magnitude of the bias current may be fixed, or changed depending on the environment.

For example, the threshold value Ith may be changed by external factors such as a change of environmental temperature. In this case, the drive circuit 15-1 can change the bias current in accordance of an external factor.

For example, the drive circuit 15-1 can be configured to store a relationship between the threshold value Ith and ambient temperature in advance, can be configured to measure environmental temperature prior to measuring the distance (e.g., just before time t0 in FIG. 10), can be configured to determine the magnitude of the bias current based on the measured ambient temperature and the pre-set relationship, and can be configured to output the bias current having the determined magnitude in a period from time t0 to time t4.

Further, the output start timing and the output stop timing of the bias current by the drive circuit 15-1 can be defined based on a relationship with the output timing of the modulation current.

For example, it can be configured that the drive circuit 15-1 starts to output the bias current, and then the drive circuit 15-2 starts to output the modulation current when a first setting time period elapses from the start of outputting the bias current by the drive circuit 15-1 (e.g. a period from time t0 to time t1 in FIG. 10 corresponds the first setting time period), and when a second setting time period elapses after the drive circuit 15-2 stops to output the modulation current, the drive circuit 15-1 stops to output the bias current (e.g., a period from time t2 to time t4 in FIG. 10 corresponds the second setting time period).

In this configuration, a time period that the bias current is being output while the modulation current is not output can be set shorter, with which power consumption of the distance measurement apparatuses 1 and 1*a* can be reduced.

Further, the drive circuit 15-1 can be configured to output the bias current constantly when the power supply is turned on for the distance measurement apparatuses 1 and 1*a*.

Second Embodiment

Hereinafter, a description is given of a distance measurement apparatus of a second embodiment. In the second embodiment, the same names and the same reference numerals are attached to the same components of the first embodiment, and a duplicated description will be omitted. A description is given of a distance measurement apparatus 3 as the second embodiment.

Figure 12:
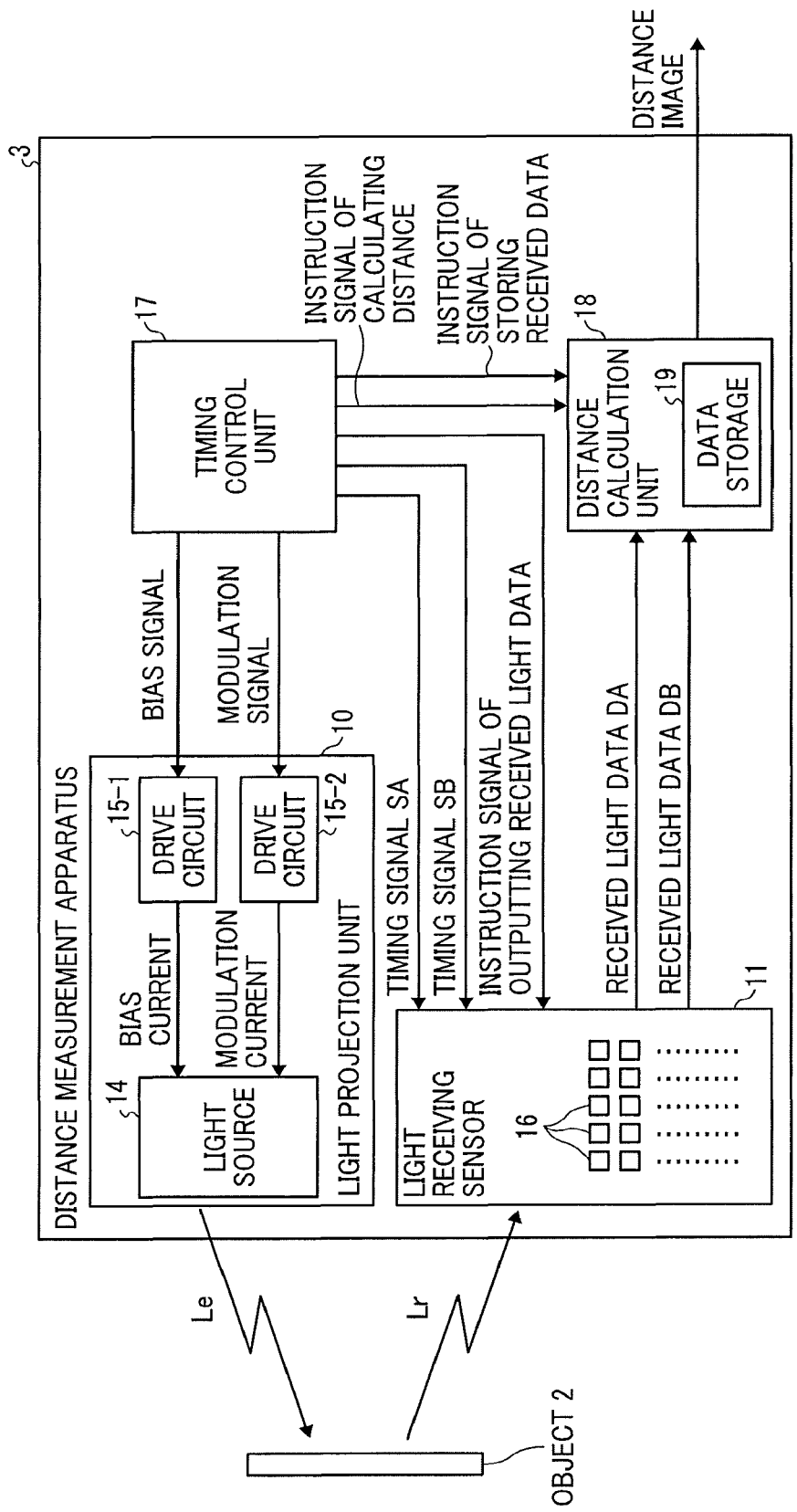
FIG. 12 illustrates an example of a schematic configuration of a distance measurement apparatus of a second embodiment.

FIG. 12 illustrates an example of a schematic configuration of the distance measurement apparatus 3 of the second embodiment. The distance measurement apparatus 3 includes, for example, a light projection unit 10, a light-receiving sensor 11, a timing control unit 17, and a distance calculation unit 18.

When a semiconductor laser or a light-emitting diode is employed as the light source 14, the light source 14 emits light slightly even if the magnitude of the drive current is equal to the threshold value Ith or less.

In this configuration, when the light emitted in accordance of the bias current is reflected from the object 2, and then enters the light-receiving sensor 11, and then the charge amount corresponding to the amount of received light is accumulated in the charge accumulation units 162A and 162B, in which the ratio of the charge amount accumulated in the charge accumulation units 162 A and 162B deviates from the above described ideal relationship, with which, the distance measurement error or ranging error may occur.

Therefore, as to the distance measurement apparatus 3, the light source 14 is supplied with one current using a first mode that supplies the one current to the light source 14 by superimposing the bias current and the modulation current, and the light source 14 is supplied with another current using a second mode that supplies the bias current alone to the light source 14 as another current without supplying the modulation current to the light source 14, and the distance measurement apparatus 3 detects the reflection light Lr under both of the first and second modes. Then, the distance measurement apparatus 3 subtracts the detection amount detected in the second mode from the detection amount detected in the first mode.

Hereinafter, a light component, corresponding to the modulation current, included in the light (irradiation light Le and reflection light Lr) is referred to as a modulation component. Further, a light component obtained by subtracting the modulation component from the light (irradiation light Le and reflection light Lr) is referred to as a noise component.

In order to process the received light data DA and the received light data DB detected under the above-described first and second modes, the distance calculation unit 18 includes, for example, a data storage 19 for temporarily storing any one of the received light data DA and the received light data DB based on the detection timing of the received light data DA and the received light data DB. For example, when the received light data DA is acquired earlier than the received light data DB, the data storage 19 temporarily stores the received light data DA, and when the received light data DB is acquired earlier than the received light data DA, the data storage 19 temporarily stores the received light data DB. The data storage 19 employs, for example, a register or a memory.

When the distance calculation unit 18 is implemented by software, the data storage 19 can be implemented by the storage unit 21.

The timing control unit 17 outputs a signal to the light projection unit 10 using one of the first and second modes as an initial mode, and then outputs a signal to the light projection unit 10 using the other one of the first and second modes as a next mode.

When the timing control unit 17 instructs the light-receiving sensor 11 to output the received light data DA and received light data DB detected under the initial mode, the timing control unit 17 outputs a data storing signal to the distance calculation unit 18. Further, when the timing control unit 17 instructs the light-receiving sensor 11 to output the received light data DA and received light data DB detected under the next mode, the timing control unit 17 outputs the signal instructing the calculation of distance to the distance calculation unit 18.

When the distance calculation unit 18 receives the data storing signal from the timing control unit 17, the distance calculation unit 18 inputs the received light data DA and the received light data DB transmitted from the light-receiving sensor 11 to the data storage 19.

Further, when the distance calculation unit 18 receives the signal instructing the calculation of distance from the timing control unit 17, the distance calculation unit 18 calculates distance data by using the difference of the received light data DA and DB stored in the data storage 19 and the received light data DA and DB transmitted from the light-receiving sensor 11.

Further, any one of the first and second modes can be executed as the initial mode. In the following description, an operation under the first mode is executed at first as the initial mode, and then the second mode is executed as the next mode. It should be noted that the second mode can be executed as the initial mode, and then the first mode can be executed as the next mode.

Figure 13:
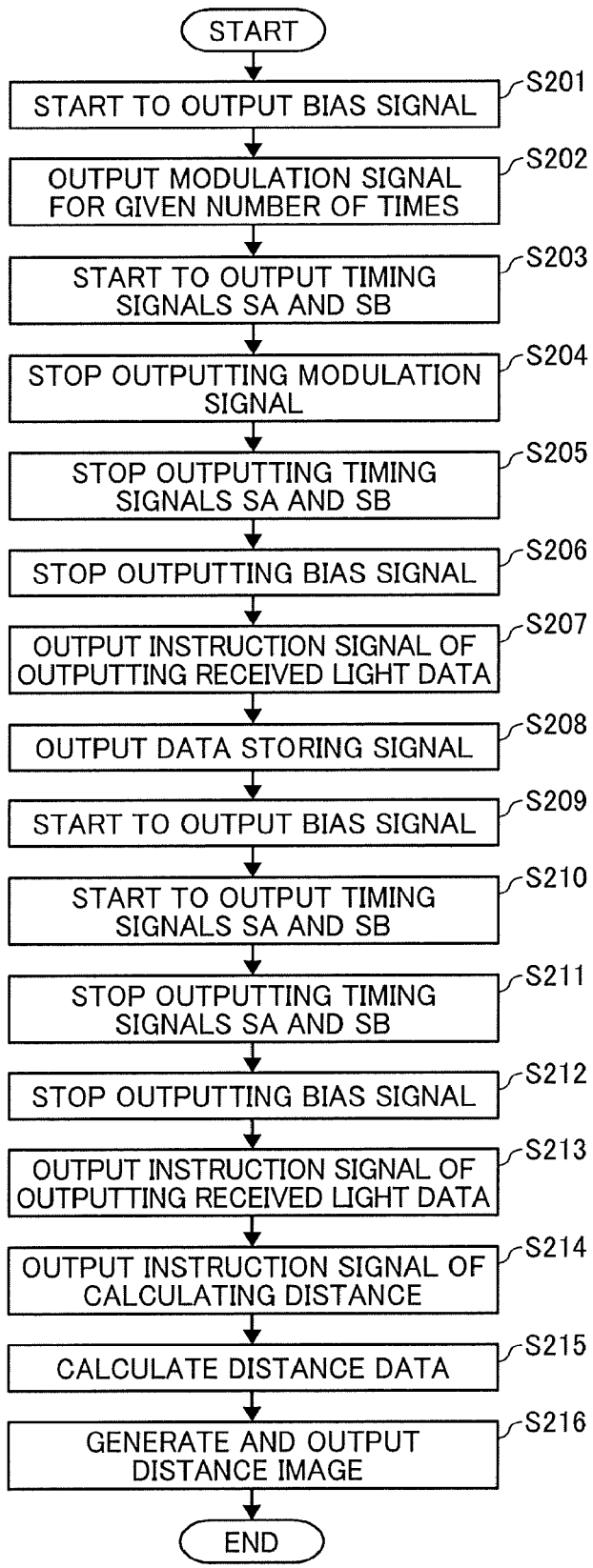
FIG. 13 is an example of a flowchart illustrating the steps of an operation of the distance measurement apparatus of the second embodiment.
Figure 14:
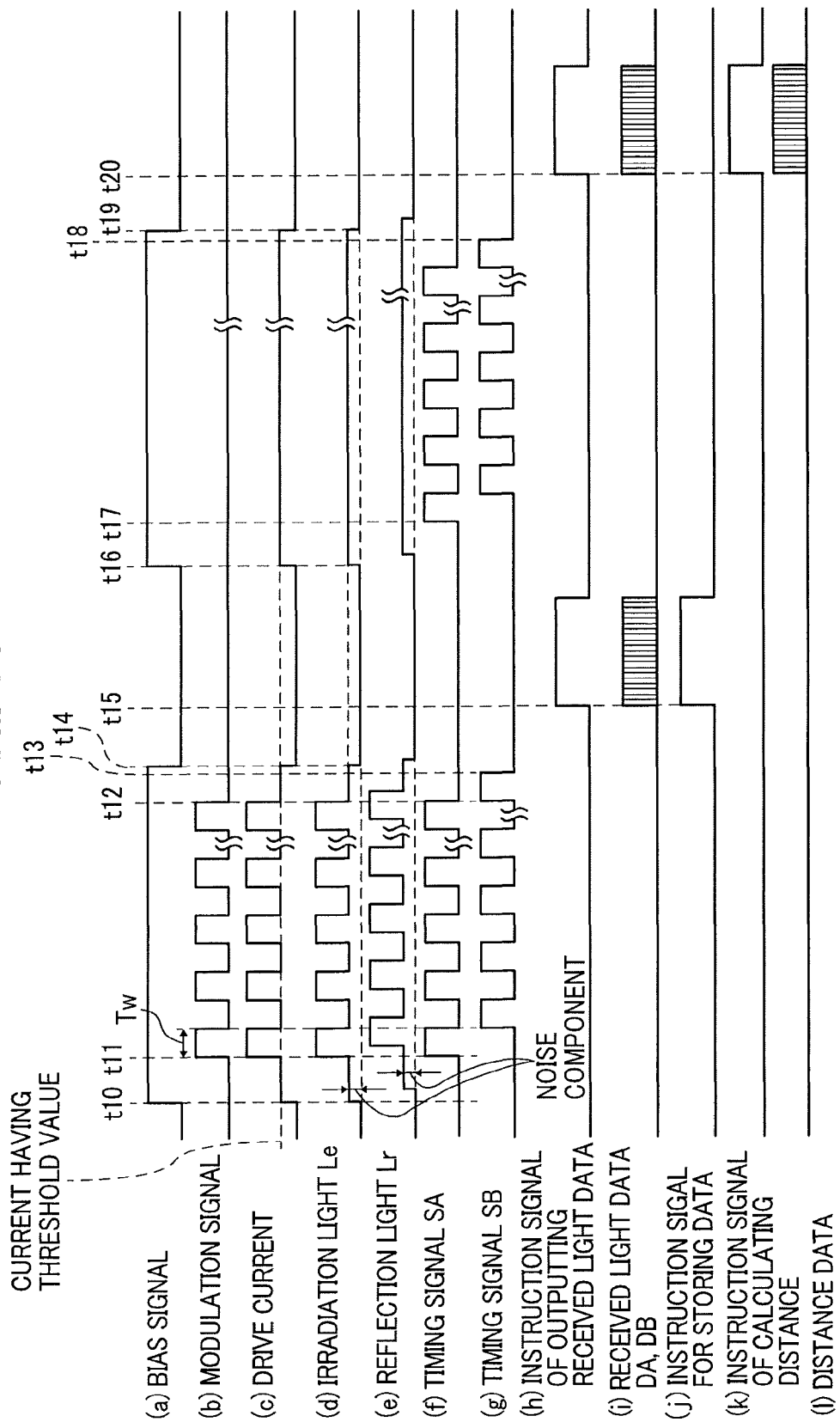
FIG. 14 is an example of a time chart of signals and data used for an operation of the distance measurement apparatus of the second embodiment.

FIG. 13 is an example of a flowchart illustrating the steps of an operation of the distance measurement apparatus 3 of the second embodiment. FIG. 14 is an example of a time chart of signals and data used for an operation of the distance measurement apparatus 3 of the second embodiment, in which the timing of the bias signal, the modulation signal, the bias current, the modulation current, the drive current, the irradiation light Le, the reflection light Lr, the timing signal SA, the timing signal SB, the signal instructing the output of the received data, the signal instructing the calculation of distance, and the calculation of distance data are illustrated.

At first, processing from S201 to S206 similar to the processing of S101 from S106 in FIG. 9 is performed, in which the bias modulation signal, the drive current, the timing signal SA, and the timing signal SB (FIG. 14(a), (b), (c), (f), (g)) change in a period from time t10 until time t14 similar to the period from the time t0 until the time t4 of FIG. 10.

In the second embodiment, each of the irradiation light Le (FIG. 14(d)) and the reflection light Lr (FIG. 14(e)) includes a noise component caused by the emission of the light corresponding to the bias current. Therefore, when the corresponding timing signal is at the "H" level, each of the charge accumulation units 162A and 162B accumulates the electric charges generated by the modulation component and the electric charges generated by the noise component.

Figure 15:
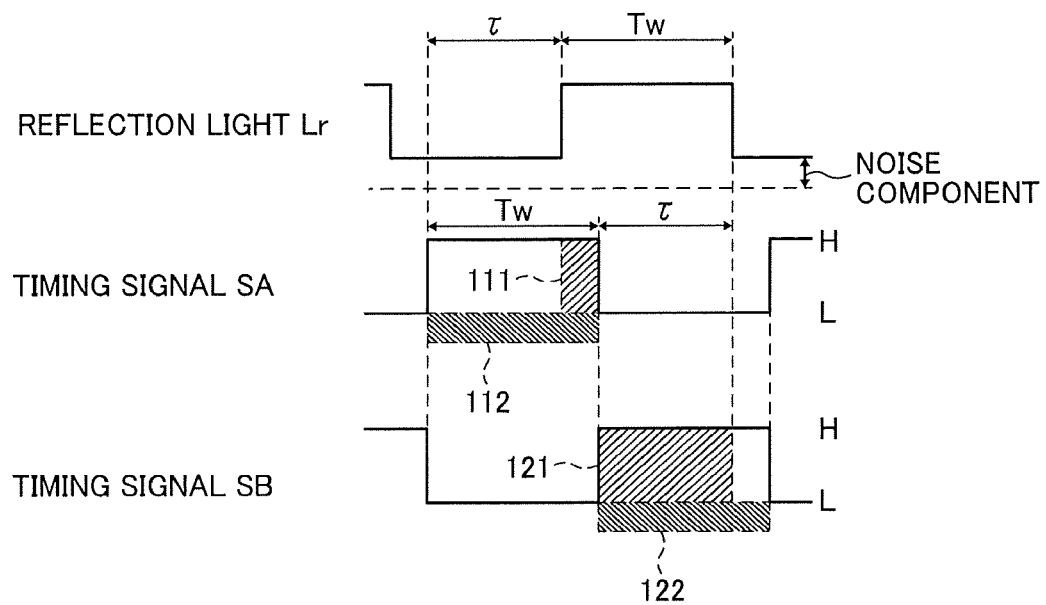
FIG. 15 is a schematic diagram of amount of charges accumulated in each of charge accumulation units during an operation under a first mode of the second embodiment.

FIG. 15 is a schematic diagram of amount of charges accumulated in the charge accumulation units 162A and 162B when the timing signals SA and SB are output by performing step S203.

In the second embodiment, the electric charge amount corresponding to the total of the area 111 and the area 112 is accumulated in the charge accumulation unit 162A, and the electric charge amount corresponding to the total of the area 121 and the area 122 is accumulated in the charge accumulation unit 162B for one pulse.

The area 111 indicates a component that is accumulated due to the modulation component, and the area 112 indicates a component that is accumulated due to the noise component. Similarly, the area 121 indicates a component that is accumulated due to the modulation component, and the area 122 indicates a component that is accumulated due to the noise component.

As described above, when the corresponding timing signal is at the "H" level, the charge accumulation units 162A and 162B continue to accumulate the electric charge caused by the noise component.

After processing at step S206, the timing control unit 17 outputs the signal instructing the output of the received light data to the light-receiving sensor 11 (S207 in FIG. 13, FIG. 14(h), time t15 in FIG. 14).

In response to the signal instructing the output of the received light data, in the light-receiving sensor 11, each of the light-receiving elements 16 outputs the charge amount accumulated in the charge accumulation unit 162A as the received light data DA, and the charge amount accumulated in the charge accumulation unit 162B as the received light data DB to the distance calculation unit 18, respectively (FIG. 14(i)).

Further, when the timing control unit 17 outputs the signal instructing the output of the received light data to the light-receiving sensor 11, the timing control unit 17 outputs the data storing signal to the distance calculation unit 18 (S208 in FIG. 13, FIG. 14(j)).

In response to the data storing signal, the distance calculation unit 18 sequentially inputs the received light data DA and the received light data DB of each of the light-receiving elements 16 transmitted from the light-receiving sensor 11 to the data storage 19.

With this processing, the operation under the first mode is completed, and the operation is shifted to the second mode.

When the operation is shifted to the second mode, the timing control unit 17 starts to output the bias signal again (S209 in FIG. 13, time t16 in FIG. 14).

Then, the drive circuit 15-1 of the light projection unit 10 outputs a drive current (i.e., bias current corresponding to bias signal) having a magnitude that is equal to the threshold value Ith (FIG. 14(c), time t16 in FIG. 14).

Then, the light source 14 emits the light in accordance of the drive current. The level of light emission by the light source 14 is equal to the noise component under the first mode (FIG. 14(d)).

Then, the timing control unit 17 starts to output the timing signal SA and the timing signal SB again (S210 in FIG. 13, FIG. 14(f), (g), time t17 in FIG. 14).

Figure 16:
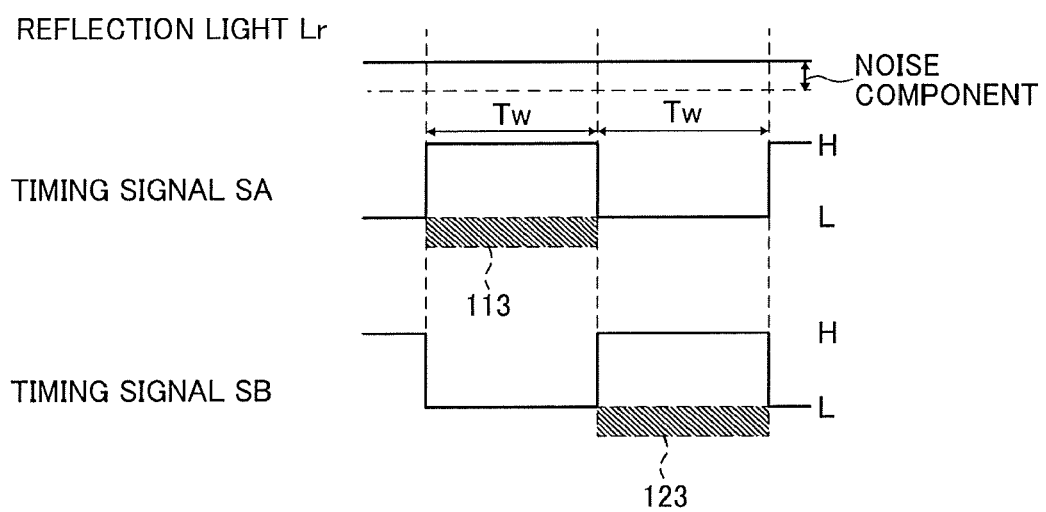
FIG. 16 is a schematic diagram of amount of charges accumulated in each of charge accumulation units during an operation under a second mode of the second embodiment.

FIG. 16 is a schematic diagram of amount of charges accumulated in each of the charge accumulation units 162A and 162B when the timing signals SA and SB are output by performing step S210.

An electric charge amount corresponding to an area 113 is accumulated in the charge accumulation unit 162A, and an electric charge amount corresponding to an area 123 is accumulated in the charge accumulation unit 162B for one pulse.

The area 113 indicates a component that is accumulated due to the noise component, and a size of the area 113 is substantially equal to a size of the area 112 (FIG. 15). Similarly, the area 123 indicates a component that is accumulated due to the noise component, and a size of the area 123 is substantially equal to a size of the area 122 (FIG. 15).

In this configuration, when the corresponding timing signal is at the "H" level, the charge accumulation units 162A and 162B continue to accumulate the electric charge caused by the noise component.

Then, the timing control unit 17 stops to output the timing signal SA and the timing signal SB (S211 in FIG. 13, time t18 in FIG. 14), In one example case, when the timing control unit 17 outputs the timing signal SA and the timing signal SB under the second mode with the number of times same as the number of times under the first mode, the timing control unit 17 stops to output the timing signal SA and the timing signal SB to set the number of times for accumulating the electric charge in each of the charge accumulation units 162A and 162B equal under both of the first mode and the second mode.

Then, after stopping the output of the timing signal SA and the timing signal SB, the timing control unit 12 stops to output the bias signal (S212 in FIG. 13, time t19 in FIG. 14)

Then, the timing control unit 17 outputs the signal instructing the output of the received light data to the light-receiving sensor 11 (S213 in FIG. 13, FIG. 14(h), time t20 in FIG. 14).

In response to the signal instructing the output of the received light data, in the light-receiving sensor 11, each of the light-receiving elements 16 outputs the charge amount accumulated in the charge accumulation unit 162 A as the received light data DA and the charge amount accumulated in the charge accumulation unit 162B as the received light data DB to the distance calculation unit 18, respectively (FIG. 14(i)).

Further, when the timing control unit 17 outputs the signal instructing the output of the received light data to the light-receiving sensor 11, the timing control unit 17 outputs the signal instructing the calculation of distance to the distance calculation unit 18 (S214 in FIG. 13, FIG. 14(k))

In response to the signal instructing the calculation of distance, the distance calculation unit 18 calculates the distance data for each of the light-receiving elements 16 (S215 in FIG. 13, FIG. 14(1)).

Specifically, the distance calculation unit 18 subtracts the received light data DA transmitted from the light-receiving sensor 11 in response to the processing at S214 from the received light data DA stored in the data storage 19. Further, the distance calculation unit 18 subtracts the received light data DB transmitted from the light-receiving sensor 11 in response to the processing at S 214 from the received light data DB stored in the data storage 19.

By subtracting the received light data DA and DB detected under the second mode from the received light data DA and DB detected under the first mode, the component caused by the noise component can be removed from the reflection light Lr, with which the charge amount generated by the modulation component alone can be obtained.

Specifically, an amount corresponding to the area 111 (FIG. 15) is obtained by performing a subtracting process for the received data DA, and an amount corresponding to the area 121 (FIG. 15) is obtained by performing a subtracting process for the received light data DB Further, the reflection light Lr can include the noise component caused by light emitted due to the bias current, and also a noise component caused by external light such as sunlight. Even in this case, the component caused by the external light can be removed, and thereby the amount of charges generated by the modulation component alone can be obtained.

In this description, the data obtained by performing the subtracting process for the received light data DA is referred to as DA2, and the data obtained by the subtracting process for the received light data DB is referred to as DB2. The distance calculation unit 18 calculates distance data (distance) by substituting the data DA2 and DB2 in the following formula (4).

$$\text{Distance} = DB2/(DA2+DB2) \times Tw \times Vc/2 \quad (4)$$

Then, the distance calculation unit 18 generates a distance image by arranging each distance data, and outputs the distance image (S216 in FIG. 13). Then, the operation of the distance measurement apparatus 3 of the second embodiment is completed.

As described above, in the second embodiment, the drive circuits 15-1 and 15-2 respectively output the bias current and the modulation current simultaneously to the light source 14 in a first period, and the drive circuit 15-1 outputs the bias current to the light source 14 in a second period without outputting the modulation current, in which the second period is different from the first period. Specifically, in an example case of FIG. 14, the first period corresponds to a period from time t10 to time t14, in which the drive circuit 15-1 outputs the bias current and the drive circuit 15-2 outputs the modulation current simultaneously to the light source 14 from time t11 to time t12, which is a part of the period from time t10 to time t14. Further, the second period corresponds to a period from time t16 to time t19, in which the drive circuit 15-1 outputs the bias current to the light source 14 without outputting the modulation current to the light source 14. The light-receiving sensor 11 is configured to output the received light data DA and DB in the first period as the detection amount of the reflection light, and the received light data DA and DB in the second period as the detection amount of the reflection light. The distance calculation unit 18 calculates the distance to the object 2 based on the data DA2 and DB2 obtained by subtracting the detection amount of the reflection light detected in the second period from the detection amount of the reflection light detected in the first period.

The first period corresponds to, for example, a period from the start of processing of S202 until the completion of processing of S204 of FIG. 13. The second period corresponds to, for example, a period from S209 to S212 of FIG. 13. It should be noted that the first period can be set for the initial mode, and then the second period can be set for the next mode, or the second period can be set for the initial mode, and then the first period can be set for the next mode.

With this configuration, the noise component caused by the light emitted due to the bias current can be removed. Therefore, the distance measurement error related to the emission characteristics of the light source 14 can be further suppressed compared to the first embodiment.

Further, as described above, the distance calculation unit 18 includes the data storage 19 as a storage to store data.

With this configuration, the distance calculation unit 18 can selectively store any one of the detection amount of the reflection light detected in the first period and the detection amount of the reflection light detected in the second period. When the detection amount of the reflection light detected in the first period is acquired at an earlier timing than the detection amount of reflection light detected in the second period, the distance calculation unit 18 stores the detection amount of the reflection light detected in the first period in the data storage 19, and when the detection amount of the reflection light detected in the second period is acquired at an earlier timing than the detection amount of the reflection light detected in the first period, the distance calculation unit 18 stores the detection amount of the reflection light detected in the second period in the data storage 19.

Figure 17:
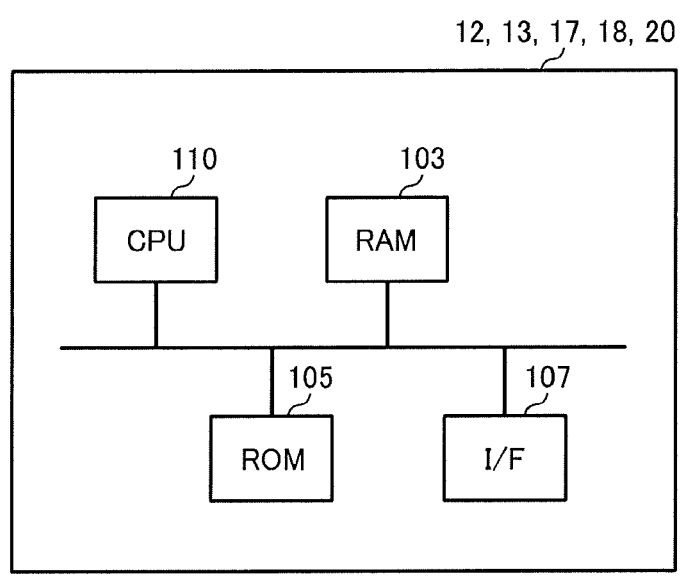
FIG. 17 is an example of a hardware block diagram of a timing control unit of the distance measurement apparatus of the embodiments.

FIG. 17 is an example of a hardware block diagram of the timing control unit 12 of the distance measurement apparatus of the embodiments. As illustrated in FIG. 17, the timing control unit 12 includes, for example, a central processing unit (CPU) 110, a read-only memory (ROM) 105, a random access memory (RAM) 103, and an interface (I/F) 107, and the functions of the units of the timing control unit 12 are implemented when the CPU 110 executes programs stored in the ROM 105 in cooperation with the RAM 103, but not limited thereto. For example, at least part of the functions of the units of the timing control unit 12 can be implemented by a dedicated hardware circuit such as a semiconductor integrated circuit. The program executed by the timing control unit 12 of the embodiments may be configured to be provided by being recorded in a computer-readable recording medium such as a compact disk read only memory (CD-ROM), a flexible disk (FD), a compact disk recordable (CD-R), a digital versatile disk (DVD), and a universal serial bus (USB) memory as a file of an installable format or an executable format. Alternatively, the program may be configured to be provided or distributed through a network such as the Internet. Moreover, various programs may be configured to be provided by being pre-installed into a non-volatile recording medium such as ROM 105. Further, the hardware block configuration of FIG. 17 can be applied to other units such as the distance calculation unit 13, the timing control unit 17, the distance calculation unit 18, and the computer 20.

The distance measurement apparatus and the distance measuring method of the above described embodiments can reduce the distance measurement error related to the light emission characteristics of the light source.

Numerous additional modifications and variations for the modules, the units, and the apparatuses are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A distance measurement apparatus comprising:
a light source to emit irradiation light;
circuitry to output, to the light source, a first current that changes in accordance with light-emission timing information defining at least turn-on timing of the light source, and a second current that does not change in accordance with the light-emission timing information; and
a sensor to detect reflection light reflected from an object irradiated with the irradiation light emitted from the light source,
wherein the circuitry calculates a distance to the object based on a detection amount of the reflection light detected by the sensor,
wherein the circuitry outputs the first current and the second current simultaneously in a first period, and outputs the second current in a second period without outputting the first current, the second period is different from the first period,
wherein the sensor outputs a detection amount of the reflection light detected in the first period, and a detection amount of the reflection light detected in the second period, and
wherein the circuitry calculates the distance to the object based on an amount obtained by subtracting the detection amount of the reflection light detected in the second period from the detection amount of the reflection light detected in the first period.

2. The distance measurement apparatus of claim 1, further comprising:
a memory that temporarily stores one of the detection amount of the reflection light detected in the first period and the detection amount of the reflection light detected in the second period,
wherein, when the detection amount of the reflection light detected in the first period is acquired at an earlier timing compared to the detection amount of the reflection light detected in the second period, the memory stores the detection amount of the reflection light detected in the first period, and
when the detection amount of the reflection light detected in the second period is acquired at an earlier timing compared to the detection amount of the reflection light detected in the first period, the memory stores the detection amount of the reflection light detected in the second period.

3. The distance measurement apparatus of claim 1, wherein the light-emission timing information defines timing of turning-on and timing of turning-off of the light source, and the first current is a pulse current generated in accordance with the light-emission timing information.

4. The distance measurement apparatus of claim 1, wherein the light source has a characteristic that a change of power of the irradiation light with respect to a change of a drive current of the light source is greater when the drive current is greater than a threshold value, and the change of power of the irradiation light with respect to the change of the drive current is smaller when the drive current is the threshold value or less, and a magnitude of the second current is set equal to the threshold value.

5. A distance measurement apparatus comprising:
a light source to emit irradiation light
circuitry to output, to the light source, a first current that changes in accordance with light-emission timing information defining at least turn-on timing of the light source, and a second current that does not change in accordance with the light-emission timing information; and
a sensor to detect reflection light reflected from an object irradiated with the irradiation light emitted from the light source,
wherein the circuitry calculates a distance to the object based on a detection amount of the reflection light detected by the sensor,
wherein the circuitry starts to output the second current, and then starts to output the first current when a first setting time period elapses from the start of outputting the second current, and
wherein the circuitry stops to output the second current when a second setting time period elapses after the circuitry stops to output the first current.

6. A method of measuring distance to an object comprising:
- outputting, to a light source, a first current that changes in accordance with light-emission timing information defining at least turn-on timing of the light source, and a second current that does not change in accordance with the light-emission timing information;
- detecting reflection light reflected from an object irradiated with irradiation light emitted from the light source; and
- calculating a distance to the object based on a detection amount of the reflection light detected by the sensor,
- wherein the outputting starts to output the second current, and then starts to output the first current when a first setting time period elapses from the start of outputting the second current, and
- wherein the outputting stops outputting the second current when a second setting time period elapses after the circuitry stops to output the first current.

7. The method according to claim 6, wherein:
the light-emission timing information defines timing of turning-on and timing of turning-off of the light source, and the first current is a pulse current generated in accordance with the light-emission timing information.

8. The method according to claim 6, wherein:
the light source has a characteristic that a change of power of the irradiation light with respect to a change of a drive current of the light source is greater when the drive current is greater than a threshold value, and the change of power of the irradiation light with respect to the change of the drive current is smaller when the drive current is the threshold value or less, and a magnitude of the second current is set equal to the threshold value.

9. The distance measurement apparatus of claim 5, wherein the light-emission timing information defines timing of turning-on and timing of turning-off of the light source, and the first current is a pulse current generated in accordance with the light-emission timing information.

10. The distance measurement apparatus of claim 5, wherein the light source has a characteristic that a change of power of the irradiation light with respect to a change of a drive current of the light source is greater when the drive current is greater than a threshold value, and the change of power of the irradiation light with respect to the change of the drive current is smaller when the drive current is the threshold value or less, and a magnitude of the second current is set equal to the threshold value.

* * * * *